No. 888,990. PATENTED MAY 26, 1908.
R. B. FULLER.
MACHINE FOR MAKING CLEATS FOR BASKET COVERS.
APPLICATION FILED APR. 29, 1907.
4 SHEETS—SHEET 1.
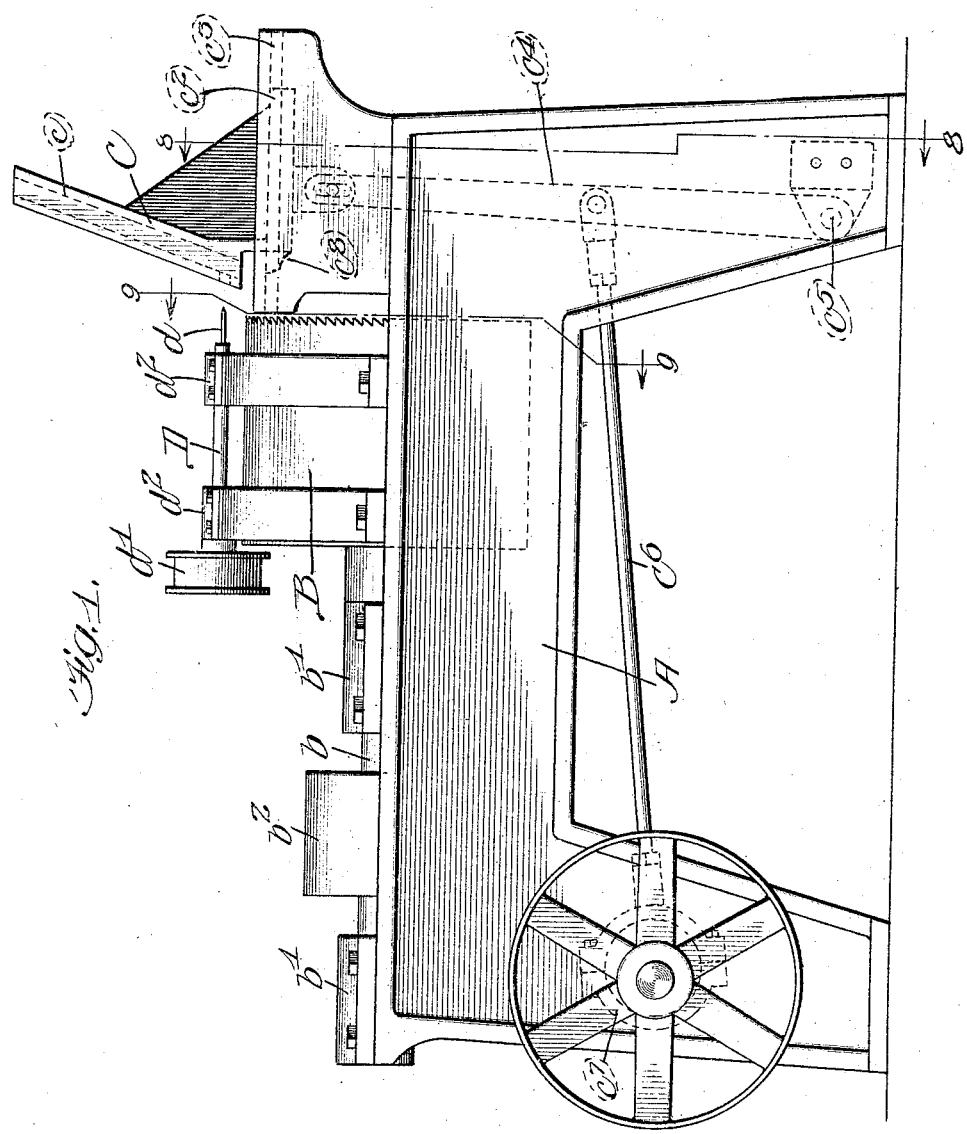

No. 888,990. PATENTED MAY 26, 1908.
R. B. FULLER.
MACHINE FOR MAKING CLEATS FOR BASKET COVERS.
APPLICATION FILED APR. 29, 1907.
4 SHEETS—SHEET 2.
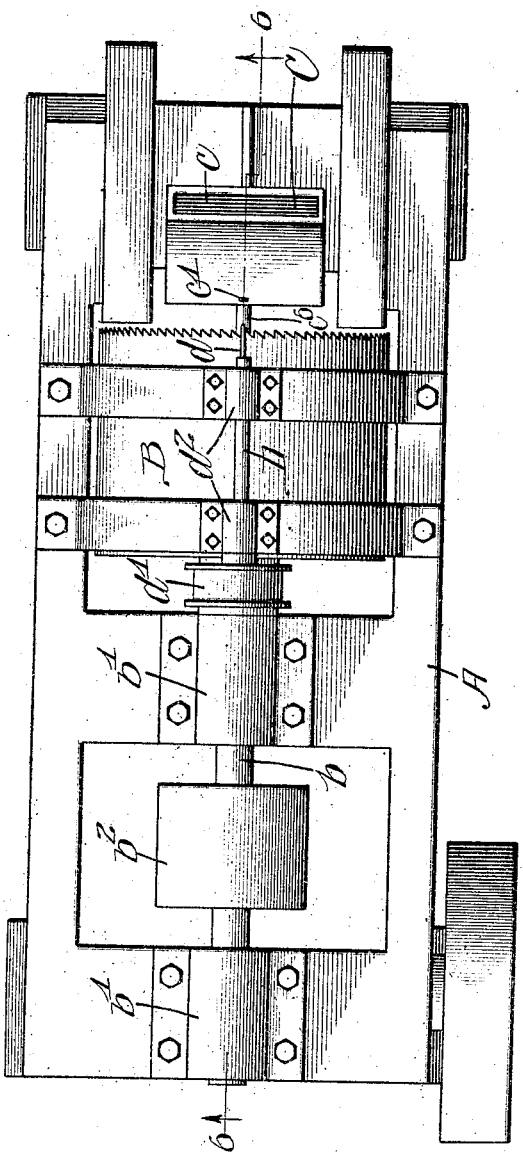
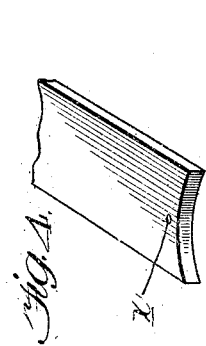
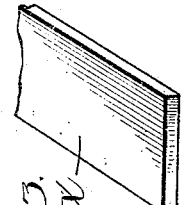
Witnesses:
Inventor
Russell B. Fuller
By Buckley Durand & Drury
attys No. 888,990. PATENTED MAY 26, 1908.
R. B. FULLER.
MACHINE FOR MAKING CLEATS FOR BASKET COVERS.
APPLICATION FILED APR. 29, 1907.
4 SHEETS—SHEET 3.
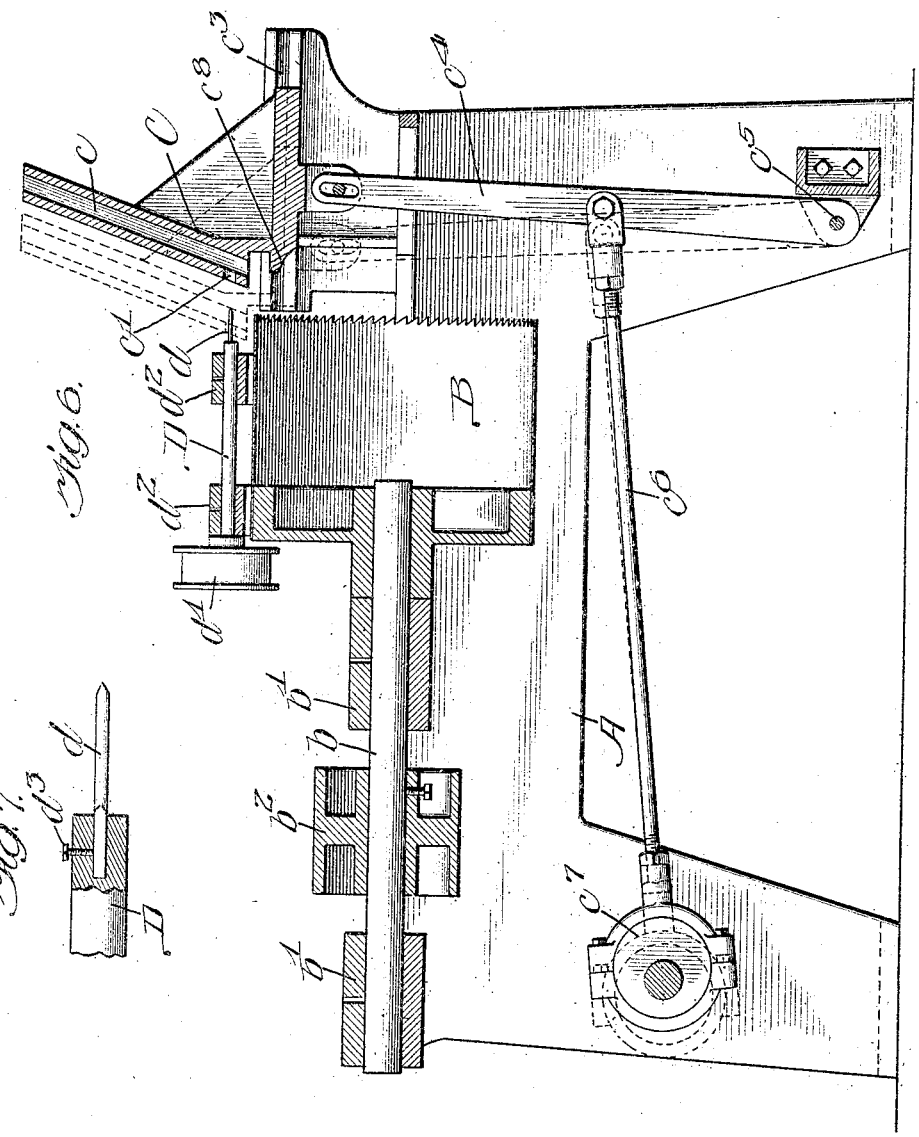

No. 888,990. PATENTED MAY 26, 1908.
R. B. FULLER.
MACHINE FOR MAKING CLEATS FOR BASKET COVERS.
APPLICATION FILED APR. 29, 1907.
4 SHEETS—SHEET 4.
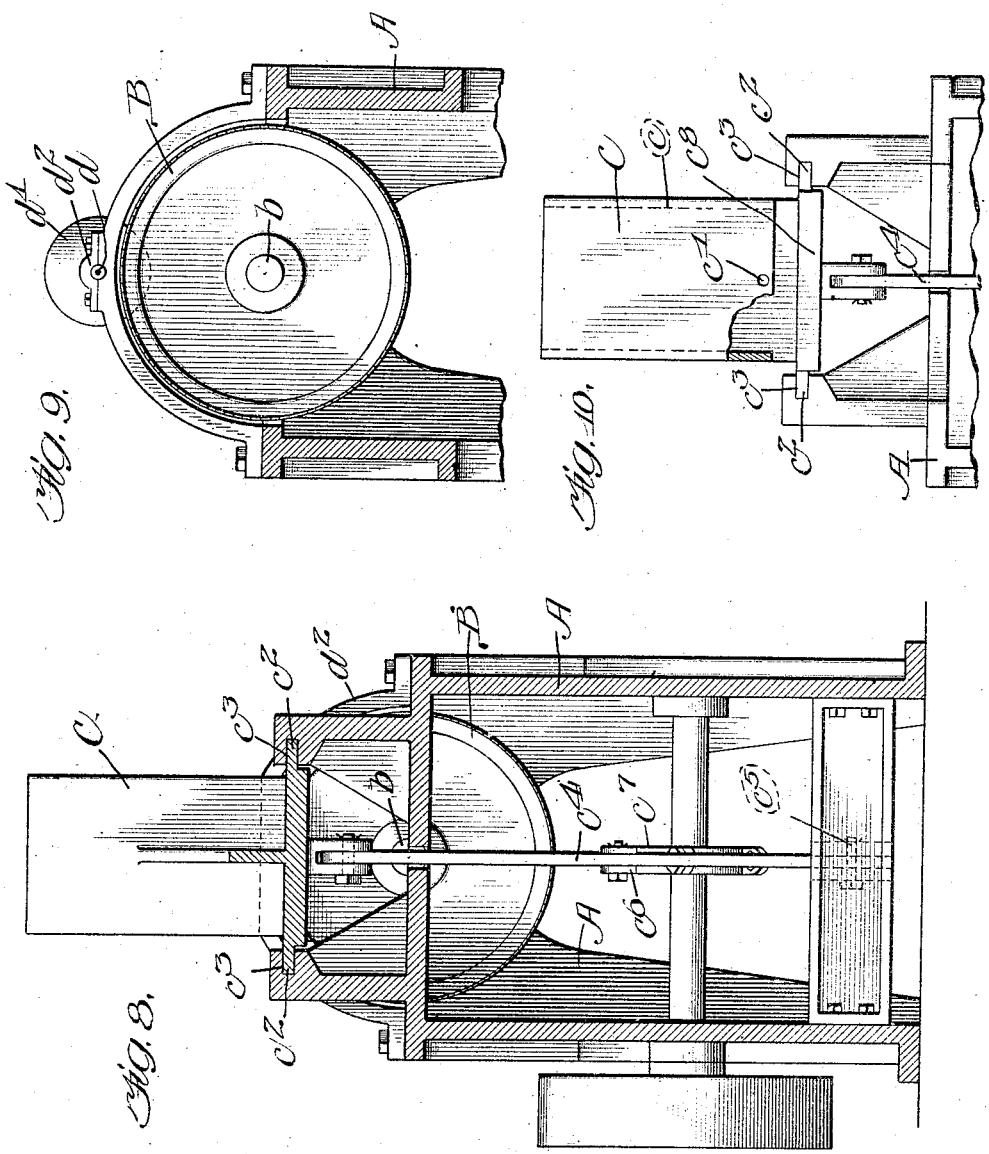

UNITED STATES PATENT OFFICE.

RUSSELL B. FULLER, OF EVANSVILLE, INDIANA.

MACHINE FOR MAKING CLEATS FOR BASKET-COVERS.

No. 888,990.  Specification of Letters Patent.  Patented May 26, 1908.

Application filed April 29, 1907. Serial No. 370,790.

*To all whom it may concern:*

Be it known that I, RUSSELL B. FULLER, a citizen of the United States of America, and resident of Evansville, Vanderburg county, Indiana, have invented a certain new and useful Improvement in Machines for Making Cleats for Basket-Covers, of which the following is a specification.

My invention contemplates a machine for cutting and drilling the cleats of basket covers. These covers are of the kind in which two end cleats are connected by slats. Covers of this character are commonly used for grape or other fruit baskets, and are held in place by flexible wires or attaching devices. The cleats must be properly cut and shaped, and it is desirable that they be drilled to receive the wires or attaching devices by which the covers are secured to the baskets. By my invention the cutting or shaping and the drilling of the cleats are all done in one and the same machine.

In the accompanying drawing—Figure 1 is a side elevation of a machine embodying the principles of my invention. Fig. 2 is a plan of the same. Figs. 3, 4 and 5 show the board and the way in which the cleats are cut therefrom. Fig. 6 is a longitudinal section on line 6—6 in Fig. 2. Fig. 7 is an enlarged detail view of the drill. Fig. 8 is a cross section on line 8—8 in Fig. 1. Fig. 9 is a cross section on line 9—9 in Fig. 1. Fig. 10 is a detail front elevation of the hopper or guide for the board.

As thus illustrated, my invention comprises a bed or body A and a drum saw B mounted thereon. Said saw has a horizontal shaft $b$ mounted in bearings $b^1$ and provided with a belt pulley $b^2$ by which the saw is driven. An inclined hopper or guide C is provided with a straight guide way or throat $c$ in which the board X feeds downwardly. Said hopper has an opening $c^1$ for the drill D, and has guides $c^2$ adapted to slide in the ways $c^3$ on the bed or body A. An upright lever $c^4$ has its lower end pivoted at $c^5$ and its upper end suitably connected with the said hopper C. Said lever is connected by a pitman $c^6$ with an eccentric device $c^7$, by which the said hopper is given a reciprocating motion toward and away from the saw B and drill D. The said drill has a bit $d$ and a drive pulley $d^1$, and is mounted to rotate in bearings $d^2$, which latter are supported on a pair of arches that span the frame above the saw. Thus the drill rotates about a horizontal axis directly above the drum saw, which latter also rotates about a horizontal axis, the saw and the drill both facing toward the hopper C. Said bit $d$ is held in place in the body of the drill by the set screw $d^3$.

When the hopper moves forward the saw B cuts off the lower end of the board, and at the same time the drill pierces the board immediately above the cut made by the saw. The next time the hopper moves forward the saw cuts off a drilled cleat, and the end of the board is drilled for the next cleat. In this way a finished cleat is cut off and the drilling done for the next cleat each time the hopper moves forward. It will be understood that the cleats can be drilled either entirely or only partially through the thickness thereof. The inclination of the hopper gives the proper slant to the convex outer side, and to the concave inner side, of each cleat. A lip $c^8$ on the hopper or any other means supports the board in position, and the arrangement is such that the cleat drops down as soon as it is sawed off. In this way the hopper feeds the board by gravity as fast as the cleats drop from the lower end thereof. The board, when it feeds, always extends below the edge of the saw a distance equal to the width desired for the cleats. The curvature of the saw is the same as that of the inner and outer sides of each cleat.

What I claim as my invention is:

1. A machine for making basket cover cleats, comprising a saw, a drill disposed above the saw, a vertically disposed and horizontally reciprocating hopper provided with means for supporting a board vertically with the lower end thereof extending below the edge of the saw a distance equal to the width desired for the cleats, and means for reciprocating the said hopper toward and away from the said saw and drill, said hopper adapted to feed the board by gravity as fast as the drilled cleats are cut off and dropped from the lower end thereof.

2. A machine for making basket cover cleats, comprising a saw, a drill disposed above the saw, means for rotating the saw and drill about horizontal non-coincident axes, a vertically disposed and horizontally reciprocating hopper provided with means for supporting a board vertically with the lower end thereof extending below the edge of the saw a distance equal to the width desired for the cleats, means for reciprocating the said hopper toward and away from the said saw and drill, and a pair of guides for the bottom of the hopper, said hopper adapted to feed the board by gravity as fast as the drilled cleats are cut off and dropped from the lower end thereof.

3. A machine for making basket cover cleats, comprising a saw, a drill disposed above the saw, the said saw being in the form of a cylinder with teeth on the end edge thereof, a vertically disposed and horizontally reciprocating hopper provided with means for supporting a board vertically with the lower end thereof extending below the edge of the saw a distance equal to the width desired for the cleats, means for reciprocating the said hopper toward and away from the said saw and drill, and guides for supporting the hopper in an inclined position to give the cleats a bevel, said hopper adapted to feed the board by gravity as fast as the drilled cleats are cut off and dropped from the lower end thereof.

4. A machine for making basket cover cleats, comprising a saw, a drill disposed above the saw, a pair of arches supporting the drill shaft above the saw, a vertically disposed and horizontally reciprocating hopper provided with means for supporting a board vertically with the lower end thereof extending below the edge of the saw a distance equal to the width desired for the cleats, means for reciprocating the said hopper toward and away from the said saw and drill, and a frame having side members inclosing the saw and upon which the said hopper and arches are supported, said hopper adapted to feed the board by gravity as fast as the drilled cleats are cut off and dropped from the lower end thereof.

5. A machine for making basket cover cleats, comprising a saw, a drill disposed above the saw, the said saw being in the form of a cylinder having the curvature desired for the inner and outer sides of the cleats, a vertically disposed and horizontally reciprocating hopper provided with means for supporting a board vertically with the lower end thereof extending below the edge of the saw a distance equal to the width desired for the cleats, means for reciprocating the said hopper toward and away from the said saw and drill, and a frame having guides for the hopper and bearings for the various operative parts, said hopper adapted to feed the board by gravity as fast as the drilled cleats are cut off and dropped from the lower end thereof.

Signed by me at Evansville, Ind., this 22nd day of April, 1907.

RUSSELL B. FULLER.

Witnesses:
C. M. JARVIS,
ALFRED GREENE.